United States Patent Office 2,968,594
Patented Jan. 17, 1961

2,968,594
AMINO ACID AND PROCESS

Robert C. Nubel, Levittown, N.Y., assignor to Chas. Pfizer & Co., Inc., Brooklyn, N.Y., a corporation of Delaware No Drawing. Filed Feb. 3, 1958, Ser. No. 712,632

5 Claims. (Cl. 195—47)

This invention is concerned with an improved method for the preparation of diaminopimelic acid. In particular, it is concenred with an improved method of producing diaminopimelic acid by fermenation methods.

Diaminopimelic acid is an important compound in the industrial production of L-lysine, an important amino acid which is the subject of many publications found in the literature. Casida, in U.S. Patent 2,771,396, describes a method of producing diaminopimelic acid by cultivating L-lysine-less auxotrophs of E. coli in nutrient media containing glycerol and cornsteep liquor, and further describes its conversion to L-lysine by the enzyme systems of a diaminopimelic acid decarboxylase producing organism, for example, Aerobacter aerogenes which does not require L-lysine for growth.

It has now been found that diaminopimelic acid may be produced in higher yields than heretofore possible by the use of certain, novel, controlled reaction conditions. Thus, a more efficient and practical method of preparing diaminopimelic acid and consequently, L-lysine, has been developed.

This novel synthesis of diaminopimelic acid is accomplished by means of an aerated deep tank, i.e. submerged, fermenation using a mutant of E. coli which requires L-lysine for growth. Such mutants may be prepared by methods well known in the art, for example, irradiation of an E. coli strain with ultraviolet light followed by selection with penicillin. In particular, one strain of E. coli which is not able to convert diaminopimelic acid to L-lysine and which requires L-lysine for growth has been found to carry out this reaction in the best yield. A growing culture of this preferred E. coli strain which requires L-lysine for its growth and which carries out the production of diaminopimelic acid in high yield has been deposited with the American Type Culture Collection in Washington, D.C., and added to their permanent collection where it has been given the number ATCC–13024.

It has been unexpectedly found that higher yields of diaminopimelic acid as mentioned above may be obtained by cutivating L-lysine-less auxotrophs of E. coli in nutrient media containing small amounts of pyridoxine, i.e. vitamin $B_6$, in the presence of decarbohydrated beet molasses. By "decarboyhydrated beet molasses" is meant beet molasses from which the carbohydrate, i.e. sucrose, has been removed. Decarbohydrated beet molasses may be obtained in a number of ways. For example, beet molasses may be treated with the enzymes of yeast for a time sufficient to ferment the carbohydrate. Alternatively, decarbohydrated beet molasses may be obtained in fermentation sewer liquors as waste products of fermentation reactions in which beet molasses is employed as a carbohydrate source for the cultivation of the fermentation microorganism. For example, sewer liquors from many citric acid fermenations contain decarbohydrated beet molasses. Such fermentations are described in many articles in the literature, for example, a review appearing in Chem. Eng. News 23, 1952 (1945). Decarbohydrated beet molasses contain mainly nitrogenous organic compounds and inorganic salts, for example, potassium salts. In order that this reaction producing diaminopimelic acid be carried out in high yields, conditions must be carefully controlled. It has been discovered that during the fermentation the pH should be maintained near neutrality for example, a pH of from about 6.0 to about 8.0. During the fermentation pH tends to drop and neutrality is maintained by the addition of alkali, for example, sodium hydroxide, potassium hydroxide, ammonium hydroxide, alkali metal carbonates and bicarbonates or preferably calcium carbonate. Urea may also be used as it is converted to ammonia. The nutrient media used for cultivation of L-lysine-less auxotrophs of E. coli may contain in addition to pyridoxine and decarbohydrated beet molasses, a source of carbohydrate, a source of nitrogen and inorganic salts. It has been found that the addition of glycerol to the fermentation medium is particularly effective. Beet molasses is a preferred constituent of the nutrient medium since in addition to its decarbohydrated portion, it is also an economical source of carbohydrate usually containing from about 40% to about 60% sucrose. Of course, L-lysine must be added to the fermentation media. The source of L-lysine may be the amino acid or its non-toxic hydrohalide salts, for example, the hydrochloride or hydrobromide. Cornsteep liquor is a particularly good substituent of the fermentation medium since it provides L-lysine for the growth of the E. coli auxotroph and also possibly acts as an economical source of precursors such as aspartic acid and lactic acid. As mentioned above, pyridoxine must be added to the reaction mixture in small amount to obtain higher yields of diaminopimelic acid. The vitamin or its non-toxic hydrohalide salts, for example, the hydrochloride and hydrobromide salt, may be conveniently employed for this purpose. Thus, by the addition of small amounts of pyridoxine to the fermentation medium, improved yields of diaminopimelic acid are obtained.

Best results are usually obtained when employing beet molasses and glycerol at respective concentration of from about 6% to about 8% by weight and from about 5% to about 7% by volume of the fermentation medium. Smaller amounts of beet molasses and glycerol may be employed but lower yields of diaminopimelic acid may be obtained. When decarbohydrated beet molasses is employed, a carbohydrate source should be added to the fermentation medium for best results. Such a carbohydrate source may be sugar cane molasses, sucrose or glucose. Other carbohydrate source may be employed but the above mentioned sources are preferred since they are most economical. Usually, optimum results are obtained when sufficient carbohydrate source is added to provide from about 2% to about 4% by weight of carbohydrate in the nutrient medium. Fermentation sewer liquors found to be most effective as sources of the carbohydrated portion of beet molasses are those in which the original concentration of beet molasses is from about 6% to about 8% by weight. Of course, more concentrated or dilute solutions of the beet molasses residues may be employed but it is preferred to dilute or concentrate such sewer liquors to obtain a concentration of decarbohydrated beet molasses approximately equivalent to the above described range. Such fermentation sewer liquors should not contain toxic substances which inhibit the production of diaminopimelic acid by L-lysine-less auxotrophs of E. coli. From about 0.1 to about 0.5 gram of L-lysine per liter of nutrient medium provides sufficient L-lysine for the growth of the E. coli auxotroph. The concentration of pyridoxine which is found to give optimum results is from about 0.1 to about 0.2 gram per liter of nutrient medium. Slightly higher or lower concentrations of pyridoxine may be employed but the yield of the product may fall off. When employing the above preferred concentrations of the constituents of the nutrient media, yields of from about 19 to almost 24 grams of diaminopimelic acid per liter of nutrient media are obtained.

As is well known in the art of cultivating the microorganisms, certain metallic ions, for example, magnesium and potassium ions, are required for the growth of the organisms. Sources of magnesium and potassium ions should be incorporated in the nutrient medium. The decarbohydrated portion of beet molasses is a convenient source of potassium ions. Further, various trace metals, for example, iron, cobalt, nickel, zinc and so forth are also required and may be added to the nutrient medium or incorporated by the use of tap water containing them in the preparation of the nutrient medium.

The fermentation may be conducted at a temperature of from about 20° to about 40° C. although it is preferably conducted between 25° and 40° C. In general, approximately 2 to 3 days are required to obtain optimum yields. The fermentation medium is preferably aerated at a rate of from about ½ to about 2 volumes of air per volume of medium per minute while it is vigorously agitated to ensure even distribution of the air.

After the fermentation is complete, the product, diaminopimelic acid, may be isolated by standard procedures, for example, ion-exchange methods, well known to those in the art. Alternatively, diaminopimelic acid may be converted, in situ, to L-lysine by adding a diaminopimelic acid decarboxylase-producing organism directly to the fermentation broth.

The L-lysine so produced is then isolated by standard methods, for example, ion-exchange treatment, as described in numerous articles in the literature. For example, the reaction mixture is adjusted to about pH 2 with hydrochloric acid or sulfuric acid, filtered and the L-lysine absorbed by passing the filtrate through a strong cation exchange resin, such as the sulfonic acid resin, Amberlite IR-120 (Rohm & Haas Co.) and eluted by dilute alkali such as ammonium hydroxide. The eluate after boiling to remove ammonia is then passed through a weak cation exchange resin such as the carboxylic acid resin, Amberlite IRC-50 (Rohm & Haas Co.) which absorbs L-lysine. L-lysine is eluted with dilute ammonium hydroxide and the eluate freed of ammonia. L-lysine is obtained as the hydrochloride by adjusting the aqueous mixture to pH 5.0 and concentrating.

The conversion to L-lysine is effected by contacting diaminopimelic acid with the enzyme systems of a diaminopimelic acid decarboxylase-producing organisms of the family Enterobacteriaceae, for example, *Aerobacter aerogenes, Escherichia coli, Serratia marcescens, Klebsiella pneumoniae, Shigella sonnei*, and others as described in copending application, Serial Number 686,850, filed on September 30, 1957, wherein is described a process for the cultivation of improved enzyme activity by cultivating said organisms in an aqueous nutrient medium comprising glycerine, sucrose, lactose or glucose in the presence of about 0.1 equivalent weights of potassium ion and inorganic ammonium compounds or urea as the sole source of nitrogen.

The outstanding results obtained by the process of the present invention are not fully understood. The role of pyridoxine may be one of many. The vitamin may enable the organism to more efficiently utilize the various nutrients in economically producing larger amounts of diaminopimelic acid than heretofore possible. The reason for the effectiveness of the decarbohydrated beet molasses is also not clear. Whatever the theory, the present invention teaches that higher yields of diaminopimelic acid may be obtained by cultivating an L-lysine-less auxotroph of *E. coli* in the presence of a small amount of pyridoxine and the decarbohydrated portion of beet molasses under the conditions described above.

The following examples are given by way of illustration and are not to be construed as limitations of this invention many variations of which are possible within the scope and sprit thereof.

*Example I*

*E. coli*, ATCC–13024, was rinsed from an agar slant under sterile conditions into a Fernbach flask containing one liter of the following inoculum medium which was previously sterilized at 20 pounds/square inch for 45 minutes:

Crude beet molasses _____ 3%.
Glycerol (U.S.P.) _____ 4% (by volume).
$(NH_4)_2HPO_4$ _____ 3%.
L-lysine (as hydrochloride) _____ 0.2 g./l.
$MgSO_4 \cdot 7H_2O$ _____ 0.5 g./l.
Pyridoxine (as hydrochloride) _____ 0.2 g./l.
pH adjusted to 7.5 with $NH_4OH$.

The inoculum was maintained at 28° C. with shaking for 20 hours.

Another medium was prepared for the actual production of diaminopimelic acid. This medium had the following composition:

Crude beet molasses _____ 8%.
Glycerol (U.S.P.) _____ 7% (by volume).
$(NH_4)_2HPO_4$ _____ 3%.
L-lysine (as hydrochloride) _____ 0.5 g./l.
$MgSO_4 \cdot 7H_2O$ _____ 0.5 g./l.
Pyridoxine (as hydrochloride) _____ 0.2 g./l.
pH adjusted to 7.5 with $NH_4OH$.

Two liters of the above medium was autoclaved at 20 pounds/square inch for one hour.

One hundred milliliters of the inoculum medium was added to 2 liters of the production medium in a fermenter. The reaction was carried out at 28° C. with stirring at the rate of 1750 revolutions/minute and aeration at a rate of one volume of air per volume of reaction mixture per minute. During the reaction, the pH of medium was maintained at near-neutrality (above 6) by the addition of $CaCO_3$ beginning at the end of approximately 24 hours. After 48 hours, the mixture assayed as having a diaminopimelic acid content of 23.65 g./l.

*A. aerogenes*, ATCC–12409, was grown for 20 hours at 27° C. with shaking in the following inoculum which had previously been sterilized by autoclaving for 20 minutes at 20 pounds/square inch pressure:

G./l.
$Na_2HPO_4$ _____ 4.15
$K_2HPO_4$ _____ 2.0
$(NH_4)_2HPO_4$ _____ 3.0
$(NH_4)_2SO_4$ _____ 1.5
$MgSO_4 \cdot 7H_2O$ _____ 0.2
Glycerol (U.S.P.) _____ 10.0
Adjust to pH 7.8 with $NH_4OH$.

Another medium was prepared with identical composition. Two liters of this medium was autoclaved at 20 pounds/square inch pressure for 30 minutes. Twenty-five milliliters of the inoculum medium was added to 2 liters of the production medium. The resultant broth was stirred at a rate of 1750 revolutions per minute and aerated at the rate of one volume of air per volume of medium per minute during incubation at 28° C. for 20 hours.

One liter of this broth was added to one liter of the fermentation mixture containing 23.65 g. of diaminopimelic acid. The mixture was adjusted to pH 8 with $NH_4OH$. Five milliliters of toluene was added and the mixture then placed in a shaker for 10 minutes. The mixture was then incubated stationary at 35° C. After 20 hours, L-lysine was produced in 100% yield. The L-lysine was recovered by ion-exchange treatment.

Example II

A production medium was prepared having the following composition:

| | |
|---|---|
| Crude beet molasses | 6%. |
| Glycerol (U.S.P) | 5% (by volume). |
| Pyridoxine (as hydrochloride) | 0.1 g./l. |
| L-lysine (as hydrochloride) | 0.25 g./l. |
| $(NH_4)_2HPO_4$ | 3%. |
| $MgSO_4 \cdot 7H_2O$ | 0.5 g./l. | pH adjusted to 7.5 with $NH_4OH$.

One hundred milliliters of the inoculum as prepared in Example I was added to 2 liters of the production medium in a fermenter flask. The reaction was carried out as described in Example I. The reaction mixture assayed as having a diaminopimelic acid content of 19 g./l.

Example III

A production medium was prepared having the following composition:

| | |
|---|---|
| Crude beet molasses | 6%. |
| Glycerol (U.S.P.) | 5% (by volume). |
| Pyridoxine | 0.2 g./l. |
| L-lysine | 0.1 g./l. |
| $(NH_4)_2HPO_4$ | 3%. |
| $MgSO_4 \cdot 7H_2O$ | 0.5 g./l. | pH adjusted to 7.5 with $NH_4OH$.

One hundred milliliters of the inoculum as prepared in Example I was added to 2 liters of the production medium in a fermenter flask. The reaction was carried out as described in Example I. The reaction mixture assayed as having a diaminopimelic acid content of 20 g./l.

Example IV

The procedure of Example I was repeated employing 0.6 gram in place of 0.5 gram of L-lysine hydrochloride in the production medium. After 60 hours, the medium assayed as having a diaminopimelic acid content of 22 g./l.

Example V

A six percent solution of crude beet molasses containing 50% by weight of sucrose was fermented with brewer's yeast for 12 hours, after which no appreciable amount of carbohydrate was detected. The following constituents were added to the carbohydrate-free mixture:

| | |
|---|---|
| Sucrose | 4%. |
| Glycerol (U.S.P.) | 6% (by volume). |
| Pyridoxine (as hydrochloride) | 0.2 g./l. |
| $(NH_4)_2HPO_4$ | 3%. |
| $MgSO_4 \cdot 7H_2O$ | 0.5 g./l. |
| L-lysine | 0.5 g./l. |

Two liters of the above medium were autoclaved at 20 pounds/square inch for one hour.

The procedure of Example I was repeated employing the above medium as the production medium. After 60 hours, the mixture assayed as having a diaminopimelic acid content of 22 g./l.

Example VI

The procedure of Example V was repeated employing an 8% solution in place of the 6% solution of crude beet molasses with comparable results.

Example VII

The procedure of Example V was repeated employing 3.3% cerelose (glucose hydrate) in place of sucrose with comparable results.

Example VIII

The procedure of Example V was repeated employing 6.6% by weight of cane molasses which contains approximately 60% by weight of carbohydrate with comparable results.

Example IX

A carbohydrate-free citric acid sewer liquor which originally contained 6% by weight beet molasses was employed to prepare a production medium to which was added the following:

| | |
|---|---|
| Sucrose | 2%. |
| Glycerol (U.S.P.) | 6% (by volume). |
| $(NH_4)_2HPO_4$ | 3%. |
| $MgSO_4 \cdot 7H_2O$ | 0.5 g./l. |
| L-lysine (as hydrochloride) | 0.25 g./l. |
| Pyridoxine (as hydrochloride) | 0.1 g./l. |

The procedure of Example I was repeated employing the above medium as the production medium. The mixture assayed as having a diaminopimelic acid content of 19 g./l.

Example X

The procedure of Example IX was repeated employing 4% by weight of sucrose instead of 2% with comparable results.

What is claimed is:

1. A process for the production of diaminopimelic acid which process comprises cultivating *E. coli*, ATCC–13024, under submerged, aerobic conditions at a pH of from about 6.0 to about 8.0 in an aqueous nutrient medium comprising a carbohydrate source selected from the group consisting of glucose, sucrose and sugar cane molasses, a source of nitrogen, a source of magnesium and various trace metals in the presence of an initial concentration of about 0.1 to about 0.5 gram of L-lysine and from about 0.1 to about 0.2 gram of pyridoxine per liter of nutrient medium together with the decarbohydrated portion of from about 60 to about 80 gram of beet molasses per liter of nutrient medium.

2. A process for the production of diaminopimelic acid which process comprises cultivating *E. coli*, ATCC–13024 under submerged, aerobic conditions at a pH of from about 6.0 to about 8.0 in an aqueous nutrient medium comprising beet molasses, a source of nitrogen, a source of magnesium and various trace metals in the presence of an initial concentration of from about 0.1 to about 0.5 gram of L-lysine and from about 0.1 to about 0.2 gram of pyridoxine per liter of nutrient medium.

3. A process as claimed in claim 1, wherein the carbohydrate source provides from about 20 to about 40 grams of carbohydrate per liter of nutrient medium.

4. A process as claimed in claim 2, wherein the medium includes glycerol at a concentration of from about 5% to about 7% by volume, and the concentration of beet molasses is from about 6% to about 8% by weight, of the reaction medium.

5. In a process for the production of diaminopimelic acid by cultivating an *E. coli* auxotroph requiring L-lysine for growth under submerged, aerobic conditions in an aqueous nutrient medium, the improvement which comprises conducting the fermentation in the presence of from about 0.1 to about 0.2 gram of pyridoxine per liter of nutrient medium together with the decarbohydrated portion of from about 60 to about 80 grams of beet molasses per liter of nutrient medium.

References Cited in the file of this patent

UNITED STATES PATENTS

| | | |
|---|---|---|
| 2,771396 | Casida | Nov. 20, 1956 |
| 2,789,939 | Kita | Apr. 23, 1957 |
| 2,841,532 | Kita et al. | July 1, 1958 |

OTHER REFERENCES

"Advances in Enzymology," Nord, Interscience Publishers, Inc., New York (1946), vol. 6, pages 7 and 8.

Nature, vol. 169, March 1952, pages 533 to 536.

"Advances in Enzymology," Nord, Interscience Publishers, Inc., New York (1955), vol. 16, pages 297 to 299.